United States Patent [19]

Benton et al.

[11] 4,175,101

[45] Nov. 20, 1979

[54] ACRYLONITRILE BLOCK TERPOLYMER BARRIER RESINS

[75] Inventors: Kenneth C. Benton, Bedford Heights; Timothy J. Williamson, Cuyahoga Falls, both of Ohio

[73] Assignee: Standard Oil Company, Cleveland, Ohio

[21] Appl. No.: 850,988

[22] Filed: Nov. 14, 1977

[51] Int. Cl.² ............................................. C08F 293/00
[52] U.S. Cl. ........................................ 525/88; 526/219; 526/230.5; 525/89; 525/90; 525/98; 525/95
[58] Field of Search ............... 260/879, 880 R, 880 B, 260/881; 526/219, 230.5, 227

[56] References Cited

U.S. PATENT DOCUMENTS

| | | | |
|---|---|---|---|
| 3,189,663 | 6/1965 | Nozaki | 260/879 |
| 3,265,765 | 8/1966 | Holden | 260/880 B |
| 3,644,584 | 2/1972 | Fryd | 260/881 |
| 3,859,388 | 1/1975 | Hill | 260/880 B |
| 3,868,359 | 2/1975 | Sheppard | 526/219 |
| 3,880,951 | 4/1975 | Ooya | 260/879 |
| 3,957,750 | 5/1976 | MacLeay | 526/219 |
| 3,963,673 | 6/1976 | D'Angelo | 526/230.5 |

*Primary Examiner*—Paul R. Michl
*Attorney, Agent, or Firm*—John F. Jones; Larry W. Evans

[57] ABSTRACT

Novel block copolymers of acrylonitrile having good gas-barrier and impact-resistance properties are prepared by copolymerizing acrylonitrile and another comonomer, such as methyl acrylate, using an elastomer prepolymer containing free-radical initiator groupings as the copolymerization initiator.

9 Claims, No Drawings

ACRYLONITRILE BLOCK TERPOLYMER BARRIER RESINS

The present invention relates to novel acrylonitrile block polymers, and more particularly relates to acrylonitrile block polymer barrier resins having good impact resistance, and to a novel method for preparing them by incorporation of an elastomer segment into an acrylonitrile copolymer to produce a chemically joined, phase-separated block polymer system of highly uniform morphology.

Our invention involves first preparing an elastomer "prepolymer" having, either as end groups or within the polymer chain, functional groups capable of generating free radicals or which can be converted to free-radical-generating groups. This functional prepolymer is then used as a polymeric initiator for an acrylonitrile copolymerization reaction, and the resulting products are mixtures of block terpolymer structures, homopolymers, and copolymers. The novel polymeric products of our invention are useful resins for manufacturing packages having good impact resistance and gas-barrier properties, and they can also be used as impact-resistant engineering thermoplastics for use in the building, automotive, and other industries.

Especially useful in the present invention are elastomer prepolymers prepared by mass, emulsion, or solution polymerization techniques initiated by a multifunctional sequential free-radical initiatior, such as di[1,3-dimethyl-3-(t-butyl peroxy)butyl]peroxy dicarbonate, 2,5-dimethyl-2-t-butyl peroxy-5-hydro peroxy hexane, 1,3-dimethyl-3-(t-butyl peroxy)butyl-4-butyl)-azo-4-cyanovalerate, di-t-butyl-4,4'-azobis-(4-cyano peroxy valerate),

$$\overset{O}{\underset{\|}{ROOC}}-(CH_2)_n-CH=CHC-OOC-(CH_3)_3$$

wherein n is 5 to 9 and R is alkyl, aryl or hydrogen, and the like. The second-stage polymerization in which the impact-resistant resin is formed is preferably carried out by mass, suspension, or solution polymerization techniques.

The advantages of our invention over the prior art are the following: (1) There is a reduction in the nonresin recipe components compared with the currently used emulsion polymerization systems which offers significant advantages and results in a cleaner resin with improved optical and taste-odor transfer properties. (2) The invention produces a unique, highly uniform polymer morphology which produces optimum properties from the monomer combination used. (3) The practice of our invention provides a convenient means for utilizing an elastomer in a suspension polymerization system for the preparation of rubber-modified barrier resins. (4) The invention offers the possibility of varying the resin properties to a much greater extent than is possible with conventional graft polymerization systems by its capability to change molecular weights, compositions, and relative amounts of the elastomer and resin segments in the polymer. (5) There are significant advantages with regard to the recovery and drying of the resin product from suspension, solution, or mass polymerizations, in that the coagulation of a latex and subsequent processing of both the resin and the waste water are either drastically reduced or entirely eliminated.

Because acrylonitrile copolymers are usually not soluble in monomers or solvents suitable for polymerization media and there is a need for a soluble initiator in the block polymerization, the first step in the practice of this invention is the preparation of an elastomer "prepolymer" by initiating the polymerization with one of the functional groups of multi-functional sequential initiator. Such initiators have at least two different free-radical-generating groups which can be activated at will at different selected times by changing the reaction temperature, introducing a reducing agent, irradiating the system with light of the appropriate wave length, and so forth. The elastomer may be any rubbery addition polymer such as a polyacrylate of low glass-transition temperature, a diene homopolymer, or a copolymer of a diene with another comonomer or comonomers. Typical of the diene homopolymers would be polybutadiene, chloroprene polymers, polyisoprene, and 2,3-dimethyl-1,3-butadiene polymers; and typical of diene copolymer rubbers would be copolymers of at least 50% by weight of butadiene or isoprene with up to 50% by weight of at least one of styrene, acrylonitrile, methacrylonitrile, an acrylic ester such as ethyl acrylate, or a methacrylic ester such as butyl methacrylate.

The preparation of the elastomer prepolymer is preferably carried out in mass, emulsion, or solution in a suitable organic solvent. The polymerization reaction can be initiated by thermal or induced decomposition of one of the low-temperature sensitive functions of the initiator to form free radicals.

The process of the present invention can be illustrated in the preparation of a peroxyester-functional poly(n-butyl acrylate) by heating n-butyl acrylate in ethyl acetate solvent with a small amount of di-t-butyl-4,4'-azobis-(4-cyano peroxy valerate) at 60° C. for 24 hours. The same type of polymer can be prepared by including an activator such as triethylenetetramine and running the reaction at 35°-45° C. for several hours. The triethylenetetramine induces the decomposition of the peroxyester groups of the initiator at a temperature below that at which thermal decomposition of the azo group is significant.

The acrylate ester elastomer prepolymers are preferably prepared by solution polymerization in order to maintain control of the reaction. Diene containing prepolymers, on the other hand, are best prepared by bulk or emulsion polymerization in order to obtain the maximum molecular weight. A minimum molecular weight (number average) of about 10,000 is believed to be required in the elastomer prepolymer to produce the phase separation in the product which is required for giving the product impact resistance.

The second step in the polymerization process of this invention may be performed by bulk, solution, or suspension polymerization techniques. Usually the elastomer prepolymer is dissolved or dispersed in the monomer mixture, and the polymerization is initiated by thermal decomposition of the functional groups remaining in the elastomer prepolymer. If desired, the initiation in the second step may be induced at low temperatures (i.e., 20°-70° C.) by means of ultraviolet irradiation in the case of azo-type functional prepolymers, or by means of reducing agents in the case of peroxide and peroxyester-functional prepolymers. Preferred reducing agents are organic-soluble compounds, such as mercaptans, aldehydes, and amines. If the second stage is to be carried out in an aqueous system, water-soluble reducing agents, such as sodium sulfite, ferrous sulfate, sodium hypophosphate, sodium borohydride, and reducing sugars, may also be employed.

It should be noted that emulsion polymerization could be employed for either or both steps of the polymer process of this invention. However, the object of the invention is to eliminate the undesirable features of emulsion polymerization and, hence, bulk or solution polymerization is preferred for the functional prepolymer preparation step, and bulk, solution, or suspension polymerization is preferred for the second step.

In the second step, comonomers which are suitable with the essential acrylonitrile monomer include methyl acrylate, ethyl acrylate, the propyl acrylates, and the butyl acrylates; methyl methacrylate, ethyl methacrylate, the propyl methacrylates, and the butyl methacrylates; styrene, alpha-methyl styrene, indene, isobutylene, vinyl acetate, vinyl methyl ether, vinyl ethyl ether, and the like.

The process of this invention will produce resins which are thermoplastic elastomers, coating materials, water-purification membranes, and the like. This invention encompasses the copolymerization of acrylonitrile in the second step and excludes homopolymerization of acrylonitrile in this step. Copolymerization of acrylonitrile in the second step involves use of from 25 to 90% by weight, preferably 25 to 80% by weight, of acrylonitrile and correspondingly 10 to 75% by weight, preferably 20 to 75% by weight, of the comonomer. In the second step of the process of this invention, there should be present from 1 to 40 and preferably 5 to 30 parts by weight of prepolymer elastomer per 100 parts by weight of monomer.

This invention is further illustrated in the following examples wherein the amounts of ingredients are given in parts by weight unless otherwise indicated.

EXAMPLE 1

A. An elastomer prepolymer was prepared by polymerizing in bulk a mixture of 65 parts by weight of butadiene, 35 parts by weight of acrylonitrile and 2 parts by weight of di[1,3-dimethyl-3-(t-butyl peroxy) butyl] peroxy dicarbonate. The polymerization was carried out under butadiene vapor at 45° C. for several hours to 32% conversion. Excess monomer was removed by evaporation and the rubber was recovered for use in step B below.

B. A solution of 75 parts of acrylonitrile, 25 parts of methyl acrylate and 15 parts of the rubber described in A of this example was suspended in 400 parts of water containing 0.2 part of a copolymer of equimolar amounts of methyl vinyl ether and maleic anhydride, and 1.0 part of n-dodecyl mercaptan. The mixture was stirred and blanketed with N₂ and the suspension was allowed to polymerize at 60° C. for 22 hours. The yield of solid polymeric product was 56% of theory. The resulting resin was found to have the following properties: notched Izod impact strength 4.7 foot pounds per inch of notch, ASTM heat-distortion temperature 66° C., ASTM flexural strength 10,200 psi and ASTM flexural modulus $3.46 \times 10^5$ psi.

EXAMPLE 2

A. A rubbery copolymer prepolymer of butadiene: acrylonitrile 65:35 was prepared in aqueous emulsion using 400 parts of water, 2.4 parts of

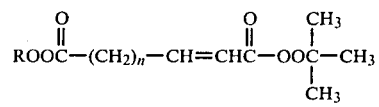

wherein R is hydrogen and n is 5 to 9, and 0.32 part of n-dodecyl mercaptan per hundred parts of monomer. The polymerization was carried out at 52° C. for 18 hours and a 73% conversion was obtained.

B. A polymerization mixture of 62.5 parts of latex A of this example, 247.5 parts of water, 60 parts of t-butyl alcohol, 0.3 part of polyvinyl pyrrolidone, 75 parts of acrylonitrile, 25 parts of methyl acrylate and 0.12 part of limonene dimercaptan was prepared. This mixture was blanketed under nitrogen in a polymerization reactor and was allowed to polymerize with stirring at 60° C. for 24 hours. A 45% conversion was obtained. The polymer beads were dried and the resin was found to have the following properties: notched Izod impact strength 12.4 foot pounds per inch of notch, ASTM heat-distortion temperature 64° C., flexural strength 9220 psi, flexural modulus 211,000 psi and tensile strength 7190 psi.

EXAMPLE 3

A. A prepolymer rubber was prepared from a mixture of 100 parts of n-butyl acrylate, 400 parts of ethyl acetate, 5 parts of di-t-butyl-4,4'-azobis-(4-cyano peroxy valerate), and 1.23 parts of triethylenetetramine. The mixture was placed in a polymerization reactor under nitrogen and was polymerized with stirring at 45° C. for 24 hours. The conversion was 80%.

B. A resin was prepared by polymerization of a mixture of 92.5 parts of the rubber solution from A of this example, 75 parts of acrylonitrile, 25 parts of methyl acrylate, 400 parts of water, and 0.2 part of polyvinyl pyrrolidone at 60° C. with stirring under nitrogen for 20 hours. The polymer was isolated by filtration to remove the suspension beads. The resulting polymer had a notched Izod impact strength of 1.0 foot pounds per inch of notch, a heat-distortion temperature of 69° C., a flexural strength of 13,600 psi, and a flexural modulus of $3.69 \times 10^5$ psi.

EXAMPLE 4

A. A functional elastomer was prepared using the procedure of Example 3A except that 100 parts of ethyl acrylate were substituted for the 100 parts of n-butyl acrylate used in Example 3A. Polymerization of the mixture at 45° C. for 24 hours produced 85% conversion to a rubbery prepolymer.

B. A resin was prepared by polymerizing a mixture of 88 parts of the rubber solution from A of this example, 75 parts of acrylonitrile and 25 parts of methyl acrylate, this mixture being added continuously over a period of 6.6 hours to a nitrogen-sparged reactor containing 400 parts of water and 0.2 part of polyvinyl pyrrolidone per 100 parts of monomer maintained at 60° C. and agitated. Polymerization was continued for a further 15.5 hours at 60° C. under nitrogen. The polymer beads were isolated by filtration and dried. The conversion was 78%. The resulting polymer had a notched Izod impact strength of 0.6 foot pounds per inch of notch, a heat-distortion temperature of 72° C., a flexural strength of 18,400 psi and a flexural modulus of $4.66 \times 10^5$ psi.

EXAMPLE 5

A. A functional elastomer was prepared by the polymerization in bulk of a mixture of 67.5 parts of isoprene, 32.5 parts of acrylonitrile and 1.0 part of di[1,3-dimethyl-3-(t-butyl peroxy) butyl] peroxy dicarbonate. The polymerization was carried out under nitrogen at 41° C. for several hours to 20% conversion. The excess monomer was removed by evaporation and the rubber was recovered for use in step B below.

B. A resin was prepared by polymerizing a mixture of 10 parts of the elastomer prepolymer from A of this example, 75 parts of acrylonitrile and 25 parts of methyl acrylate suspended in 400 parts of water containing 0.08 part of a partially hydrolized polyacrylamide per 100 parts of monomer. The polymerization was conducted under nitrogen at 60° C. for 18 hours. The polymer was recovered and dried. The conversion was 70%. The resulting polymer had a notched Izod impact strength of 0.8 foot pounds per inch of notch, a heat-distortion temperature of 52° C., a flexural strength of 5670 psi and a flexural modulus of $1.25 \times 10^5$ psi.

EXAMPLE 6

A. An elastomer prepolymer was prepared by the polymerization in aqueous emulsion of 75 parts of 1,3-butadiene, 25 parts of styrene, 300 parts of water, 1.5 parts of sodium lauryl sulfate, 1.7 parts of di[1,3-dimethyl-3-(t-butyl peroxy) butyl] peroxy dicarbonate and 0.1 part of n-dodecyl mercaptan. The polymerization was carried out under an atmosphere of butadiene vapor for several hours at 50° C. The conversion was 50%. The resulting latex was purged with nitrogen to remove excess butadiene.

B. To 230 parts of water buffered to pH 10 were added 79 parts of the rubber latex from A of this example, 75 parts of styrene, 25 parts of acrylonitrile, 0.1 part of polyvinyl pyrrolidone and 0.2 part of limonene dimercaptan. The mixture was allowed to polymerize under a nitrogen atmosphere at 86° C. for 18 hours. The polymer beads were recovered and dried. The conversion was 54%. The resulting polymer had the following physical properties: a notched Izod impact strength of 5.9 foot pounds per inch of notch, a heat-distortion temperature of 63° C., a flexural strength of 1500 psi and a flexural modulus of $1.37 \times 10^5$ psi.

EXAMPLE 7

A. A functional elastomer prepolymer was prepared by polymerizing in bulk a mixture of 65 parts by weight of butadiene, 35 parts of acrylonitrile and 2 parts of di[1,3-dimethyl-3-(t-butyl peroxy) butyl] peroxy dicarbonate at 40° C. for several hours. The product was recovered by evaporation of the excess monomers. A 28% conversion to a rubbery polymer having a weight average molecular weight of 40,500 and a number average molecular weight of 18,400 was obtained.

B. A resin was prepared by polymerizing a mixture comprising 15 parts of the elastomer prepolymer from A of this example dissolved in 75 parts of acrylonitrile and 25 parts of methyl acrylate, to which was added 0.2 part of n-dodecyl mercaptan. This monomer-prepolymer solution was suspended in 400 parts of water containing 0.2 part of polyvinyl pyrrolidone and 0.1 part of carboxy methyl cellulose as suspending aids and heated at 60° C., with agitation, under a nitrogen atmosphere for 44 hours. The polymer beads were recovered by filtration and dried. The resulting polymer had the following physical properties: a notched Izod impact strength of 1.9 foot pounds per inch of notch, a heat-distortion temperature of 61° C., a flexural strength of 6390 psi, a flexural modulus of $1.78 \times 10^5$ psi and a tensile strength of 4330 psi. An 8-mil film of this sample exhibited no measurable transmission of oxygen under the ASTM conditions normally used for the evaluation of gas permeability.

We claim:

1. The block polymeric composition resulting from the stepwise
    (A) polymerization of an acrylate ester or a mixture of at least 50% by weight of a diene monomer selected from the group consisting of butadiene, isoprene, chloroprene and 2,3-dimethyl-1,3-butadiene, and up to 50% by weight of a member selected from the group consisting of styrene, acrylonitrile, methacrylonitrile, an acrylic ester or a methacrylic ester, with a multi-functional sequential free-radical initiator selected from the group consisting of di[1,3-dimethyl-3-(t-butyl peroxy) butyl] peroxy dicarbonate, 2,5-dimethyl-2-t-butyl peroxy-5-hydro peroxy hexane, 1,3-dimethyl-3-(t-butyl peroxy) butyl-4-t-butyl)-azo-4-cyanovalerate, di-t-butyl-4,4'-azobis(4-cyano peroxy valerate),

wherein n is 5 to 9 and R is alkyl, aryl or hydrogen and then
    (B) using some of (A) as the sole polymerization initiator copolymerizing
        (1) from 25 to 90% by weight of acrylonitrile and correspondingly
        (2) from 10 to 75% by weight of a comonomer selected from the group consisting of methyl acrylate, ethyl acrylate, the propyl acrylates, the butyl acrylates, methyl methacrylate, ethyl methacrylate, the propyl methacrylates, the butyl methacrylates, styrene, alpha-methyl styrene, indene, isobutylene, vinyl acetate, vinyl methyl ether, and vinyl ethyl ether,
    wherein there are employed from 5 to 30 parts by weight of (A) per 100 parts by weight of (B).

2. The composition of claim 1 wherein (A) is a mixture of butadiene and styrene.

3. The composition of claim 1 wherein (A) is a mixture of butadiene and acrylonitrile.

4. The composition of claim 1 wherein (A) is n-butyl acrylate.

5. The composition of claim 1 wherein (A) is ethyl acrylate.

6. The composition of claim 1 wherein (A) is a mixture of isoprene and acrylonitrile.

7. The composition of claim 1 wherein (B) is a mixture of acrylonitrile and methyl acrylate.

8. The composition of claim 1 wherein (B) is a mixture of acrylonitrile and styrene.

9. The process for preparing an impact-resistant block copolymer of acrylonitrile comprising
    (A) polymerizing an acrylate ester or a mixture of at least 50% by weight of a diene monomer selected from the group consisting of butadiene and isoprene and up to 50% by weight of a member selected from the group consisting of styrene, acrylonitrile, methacrylonitrile, an acrylic ester and a methacrylic ester, with a multi-functional sequential free-radical initiator selected from the group consisting of di[1,3-dimethyl-3-(t-butyl peroxy) butyl] peroxy dicarbonate, 2,5-dimethyl-2-t-butyl peroxy-5-hydro peroxy hexane, 1,3-dimethyl-3-(t-butyl peroxy) butyl-4-t-butyl)-azo-4-cyanovalerate, di-t-butyl-4,4′-azobis(4-cyano peroxy valerate),

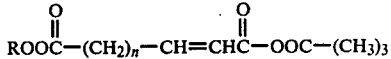

wherein n is 5 to 9 and R is alkyl, aryl or hydrogen and then (B) using some of (A) as the sole polymerization initiator copolymerizing p2 (1) from 25 to 90% by weight of acrylonitrile and correspondingly
(2) from 10 to 75% by weight of a comonomer selected from the group consisting of methyl acrylate, ethyl acrylate, the propyl acrylates, the butyl acrylates, methyl methacrylate, ethyl methacrylate, the propyl methacrylates, the butyl methacrylates, styrene, alpha-methyl styrene, indene, isobutylene, vinyl acetate, vinyl methyl ether, and vinyl ethyl ether, wherein there are employed from 5 to 30 parts by weight of (A) per 100 parts by weight of (B).

* * * * *